UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,051,319. Specification of Letters Patent. Patented Jan. 21, 1913.

No Drawing. Application filed March 20, 1907, Serial No. 363,471. Renewed December 9, 1912. Serial No. 735,846.

*To all whom it may concern:*

Be it known that I, CARLETON ELLIS, a citizen of the United States, and resident of White Plains, in the county of Westchester and State of New York, have made a certain new and useful Invention Relating to Paint or Varnish Removers, of which the following is a specification.

This invention relates to paint or varnish removers and relates especially to removers comprising solvents of an aldehyde character.

Various solvents of an aldehyde character are desirable for use in finish removers, such for example, as acetaldehyde, propionaldehyde, butylaldehyde and valerianaldehyde among the alipathic hydrocarbons and benzaldehyde among the aromatic hydrocarbons and the corresponding condensation products, and also the derivatives of these aldehydes are in many cases desirable, a good example of such bodies being methylethylacetaldehyde. Various mixed aldehyde solvents are also available, as for instance, the neutral oxidation products of an aldehyde character prepared from fusel oil and also similar oxidation products from light oil of wood tar, resin spirits and similar organic bodies which may in some instances be employed in connection with the corresponding acid products formed by still further oxidation. Suitable aldehyde solvent material of such character may be used in removers in connection with other loosening finish solvent material, that is, solvent material of a generally alcoholic character or action in removers, such as methyl, ethyl, propyl, butyl, allyl and other strict alcohols, preferably in their commercial forms, including denatured alcohol, or ketonic bodies, such as methyl ethyl ketone, ethyl butyl ketone, oil of acetone, acetone and its condensation derivatives, mesityl oxid, phorone, xylitone and isoxylitone. Suitable penetrating solvent material may also be employed, that is, solvents of a generally benzolic character or action in removers, such as benzol or its homologues, toluol, xylol, mesitylene, cumene, and so forth, and their commercial forms, such as commercial xylol and also the somewhat analogous petroleum hydrocarbons, such as naphtha and benzin, as well as carbon bisulfid, turpentine, wood turpentine, carbon-tetrachlorid and other chlorinated solvents.

Although not necessary in all cases, it is usually desirable to employ suitable stiffening material in the remover, such as wood flour, starch, whiting, infusorial earth and soapy or waxy bodies, such as ceresin, paraffin, bayberry tallow, beeswax, ozocerite, palm oil and nitrocellulose, many of which form effective evaporation retarding films over the exposed surface of the remover when in use. All these ingredients are preferably thoroughly incorporated by agitation at the desired moderate heat, the waxy, soapy, or other soluble evaporation retarding bodies being preferably first dissolved in the more energetic solvents for such material, although this is not always necessary.

An illustrative remover of this character may comprise benzol 35 gallons, butylaldehyde 14 gallons, benzaldehyde 20 gallons, amylacetate 10 gallons, ceresin wax 10 pounds, wood flour 25 pounds and pulverized Peruvian bark waste 50 pounds.

Other good illustrative removers for general purposes are as follows: benzol 10 parts, benzaldehyde 10 parts, xylitone 10 parts, paraffin or ceresin wax 1 part, and wood flour or similar stiffening material 5 parts. Also toluol 5 parts, benzin 5 parts, methylethylacetaldehyde 10 parts, denatured alcohol 5 parts, bayberry tallow 1 part and ozocerite 1 part.

Other illustrative removers may comprise benzaldehyde 16 parts, mesityl oxid 8 parts, acetone 4 parts, palm oil 2 parts and nitrocellulose 1 part. Also acetaldehyde 4 parts, valerianaldehyde 1 part and ceresin wax 1 part.

Another illustrative remover may comprise benzol 10 parts, propionaldehyde 10 parts and sodium stearate 1 part. Also 10 parts of benzol may be combined with one part of ceresin and incorporated with a mixture of benzaldehyde 4 parts, wood alcohol 3 parts, acetone 3 parts and sodium stearate or palmitate 1 part. In such case there is a mutual precipitating or gelatinizing action so that the wax is partially reduced to the colloidal or precipitated condition due to the reduction of solvent power of the benzol produced by the other solvents, and the benzol also similarly reduces the solvent power of the other solvents mentioned for the soapy material.

This invention has been described in connection with a number of illustrative ingredients, formulas, proportions and processes, to the details of which disclosure the invention is not, of course, to be limited.

What is claimed is:—

1. The paint or varnish remover comprising approximately benzol 35 gallons, butylaldehyde 14 gallons, benzaldehyde 20 gallons, amylacetate 10 gallons, ceresin 10 pounds, wood flour 25 pounds and pulverized Peruvian bark waste 50 pounds.

2. The paint or varnish remover comprising approximately penetrating solvent material 35 gallons, butylaldehyde 14 gallons, benzaldehyde 20 gallons, amylacetate 10 gallons and stiffening material, including wax.

3. The paint or varnish remover comprising approximately penetrating solvent material 35 gallons, aldehyde solvent material 34 gallons and stiffening material, including wax.

4. The paint or varnish remover comprising penetrating solvent material, organic neutral aldehyde solvent material and stiffening material, including wax.

5. The paint or varnish remover comprising organic finish solvent material including a considerable proportion of butylaldehyde with which wax-like evaporation-retarding material has been incorporated to stiffen the remover.

6. The paint or varnish remover comprising solvent material including butylaldehyde with which wax-like evaporation retarding material has been incorporated.

7. The paint or varnish remover comprising penetrating solvent material, butylaldehyde and film-forming evaporation retarding stiffening material.

8. The paint or varnish remover comprising composite organic finish solvent material including butylaldehyde and incorporated dissolved waxy stiffening material.

CARLETON ELLIS.

Witnesses:
JESSIE B. KAY,
HARRY L. DUNCAN.